United States Patent
Furman et al.

(10) Patent No.: US 8,081,722 B1
(45) Date of Patent: Dec. 20, 2011

(54) COMMUNICATIONS SYSTEM AND DEVICE USING SIMULTANEOUS WIDEBAND AND IN-BAND NARROWBAND OPERATION AND RELATED METHOD

(75) Inventors: William N. Furman, Fairport, NY (US); John W. Nieto, Rochester, NY (US); Brian C. Padalino, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 929 days.

(21) Appl. No.: 12/062,550

(22) Filed: Apr. 4, 2008

(51) Int. Cl.
*H04B 1/10* (2006.01)

(52) U.S. Cl. ........ 375/350; 375/219; 375/220; 375/229; 375/230; 375/231; 375/232; 375/233; 375/260; 375/295; 375/316; 375/340; 375/346; 375/349; 455/63.1; 455/114.2; 455/296; 455/501; 370/335; 370/342; 708/300

(58) Field of Classification Search .................. 375/219, 375/220, 229–233, 260, 295, 316, 340, 346, 375/349, 350; 455/63.1, 114.2, 296, 501; 370/335, 342; 708/300
See application file for complete search history.

(56) References Cited

U.S. PATENT DOCUMENTS

| | | | |
|---|---|---|---|
| 5,377,226 A | 12/1994 | Davis ............................... 375/1 |
| 5,570,423 A | 10/1996 | Walker et al. ................. 379/410 |
| 5,764,087 A | 6/1998 | Clark ............................. 327/105 |
| 5,777,910 A | 7/1998 | Lu .............................. 364/724.2 |
| 5,838,740 A | 11/1998 | Kallman et al. ............. 375/346 |
| 5,963,592 A | 10/1999 | Kim ............................. 375/232 |
| 6,037,886 A | 3/2000 | Staszewski et al. ........... 341/139 |
| 6,201,843 B1 | 3/2001 | Kingston et al. .............. 375/350 |
| 6,285,412 B1 | 9/2001 | Twitchell ...................... 348/608 |
| 6,563,868 B1 * | 5/2003 | Zhang et al. .................. 375/232 |
| 6,836,664 B2 | 12/2004 | McGovern et al. ........... 455/450 |
| 6,859,641 B2 | 2/2005 | Collins et al. ................ 455/63.1 |
| 6,980,609 B1 | 12/2005 | Ahn .............................. 375/343 |
| 7,050,491 B2 | 5/2006 | McDonald et al. ........... 375/232 |
| 7,194,025 B2 | 3/2007 | Wood et al. .................... 375/231 |
| 7,720,185 B2 * | 5/2010 | Vrcelj et al. ................... 375/349 |
| 2003/0021367 A1 | 1/2003 | Smith ............................ 375/346 |
| 2005/0213652 A1 | 9/2005 | Higashino ..................... 375/233 |
| 2005/0220230 A1 | 10/2005 | Fukuda ......................... 375/343 |
| 2005/0259728 A1 | 11/2005 | Nieto ............................ 375/233 |
| 2006/0014506 A1 * | 1/2006 | Haartsen ....................... 455/227 |
| 2006/0020650 A1 | 1/2006 | Shen et al. .................... 708/300 |
| 2006/0109938 A1 * | 5/2006 | Challa et al. .................. 375/347 |
| 2006/0176947 A1 | 8/2006 | Lim .............................. 375/232 |
| 2007/0058710 A1 | 3/2007 | Chang .......................... 375/233 |

* cited by examiner

*Primary Examiner* — Leon Flores
(74) *Attorney, Agent, or Firm* — Allen, Dyer, Doppelt, Milbrath & Gilchrist, P.A.

(57) ABSTRACT

A communications device includes a signal input for receiving both wideband and in-band, narrowband communication signals having wideband communications data that is transmitted over a wideband communications channel and narrowband communications data that is transmitted within an in-band, narrowband channels over the same wideband communications channel. A circuit splits the communications signals into a wideband signal channel and narrowband signal channels. A narrowband filter within the wideband signal channel filters the wideband communications signal and removes any narrowband communications signals. A demodulator within the wideband signal channel demodulates the filtered wideband communications signal to obtain any wideband communications data. An in-band, narrowband demodulators are positioned within the narrowband signal channels and demodulate the narrowband communications signals to obtain any narrowband communications data.

21 Claims, 9 Drawing Sheets

COMMUNICATIONS SYSTEM AND DEVICE USING SIMULTANEOUS WIDEBAND AND IN-BAND NARROWBAND OPERATION AND RELATED METHOD

FIELD OF THE INVENTION

The present invention relates to communications, and more particularly, the present invention relates to receiving and processing simultaneous wideband and in-band, narrowband signals in communications devices and systems.

BACKGROUND OF THE INVENTION

Greater numbers of communication systems and related devices such as radios used in the commercial marketplace and for national and international military forces are migrating to the use of wideband networking waveforms such as the Soldier Radio Waveform (SRW), the Wideband Networking Waveform (WNW) and the Advanced Networking Wideband Waveform (ANW2). These waveforms operate for example in bandwidths of 500 kHz up to 5 MHz. These types of modern communication systems and radios operate in wider bandwidths in order to support the higher data rates desired by users. A large amount of legacy radios and associated equipment in the HF/UHF/VHF bands that typically communicate in more narrow communications bands, however, are still in operation. For example, the AN/PRC-152 type-1 multi-band, multi-mission handheld radio produced by Harris Corporation of Melbourne, Fla. is a popular radio used for narrowband communications requiring about 25 kHz of bandwidth at carrier frequencies starting from 30 MHz up to 512 MHz with a tuning resolution of about 10 Hz.

Although this type of narrowband radio is a software defined radio, there is no hardware support in these radios to communicate with advanced wideband networking radios. Instead, multiple radios would be required if both the wideband networking waveforms are to be processed at the same time as the narrowband waveforms are processed. There are currently limited options to support simultaneous wideband and narrowband communications. These options include the use of multiple radios that are tuned to different channels, or the use of a multi-channel radio that can work on one band as a wideband waveform signal and another band as a narrowband waveform signal. These solutions, however, have frequency management and cosite transmit and receive issues.

SUMMARY OF THE INVENTION

A communications device includes a signal input for receiving both wideband and in-band, narrowband communication signals having wideband communications data that is transmitted over a wideband communications channel and narrowband communications data that is transmitted within an in-band, narrowband channel over the same wideband communications channel. A circuit splits the communications signals into a wideband signal channel and narrowband signal channel. A narrowband filter within the wideband signal channel filters the wideband communications signal and removes any narrowband communications signals. A demodulator within the wideband signal channel demodulates the filtered wideband communications signal to obtain any wideband communications data. An in-band, narrowband demodulator is positioned within the narrowband signal channel and demodulates the narrowband communications signal to obtain any narrowband communications data.

The communications data in one aspect used in the in-band, narrowband communications signal is formed as a break-in message that is used for breaking into a wideband communications network that is formed from a number of communications devices in which one of the communications devices can process both the wideband and in-band, narrowband communications signals. The in-band, narrowband communications signals could be formed as multiple in-band, narrowband communications signals. In one aspect, the wideband communications signal can be formed as a signal of about 500 kHz to about 5 MHz bandwidth. The in-band, narrowband communications signal in another aspect is formed as a signal of about 25 kHz bandwidth.

In yet another aspect, a power control circuit can generate a power control signal for controlling the transmit power from a communications device such as a narrowband radio transmitting the narrowband communications signal to enhance operation of the narrowband filter circuit and processing of the wideband communications signal. The narrowband filter circuit could be formed as an adaptive filter circuit that uses a plurality of non-adaptive and adaptive filter taps with weighted coefficients. The adaptive filter circuit could also be formed as a circuit for one of updating the adaptive filter taps responsive to a received state of a modem or data modulation type within the wideband communications signal, selecting the number and order of adaptive filter taps based on one of at least measured output power from the adaptive filter and signal modulation, and imparting a variable delay between non-adaptive and adaptive filter taps for separating the spacing of multipath. The adaptive filter circuit could be formed as an N number of adaptive filters each having a plurality of non-adaptive and adaptive filter taps.

A method aspect is also set forth.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Figure 1:
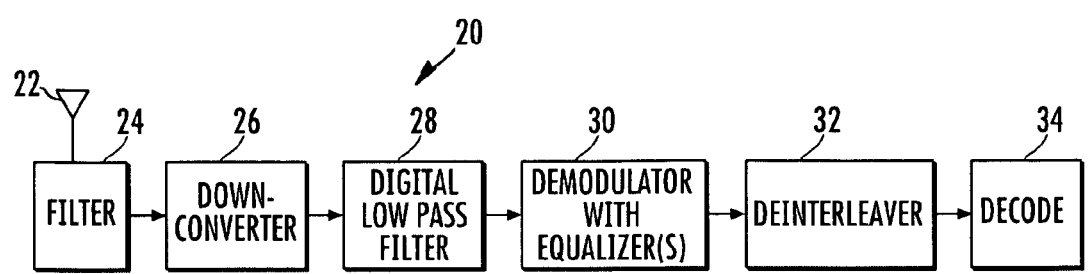
FIG. 1 is a block diagram showing basic signal processing modules used in a wireless communications device as a radio that can be modified for use in accordance with a non-limiting example of the present invention.

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art. Like numbers refer to like elements throughout.

It should be appreciated by one skilled in the art that the approach to be described is not limited for use with any particular communication standard (wireless or otherwise) and can be adapted for use with numerous wireless (or wired) communications standards such as Enhanced Data rates for GSM Evolution (EDGE), General Packet Radio Service (GPRS) or Enhanced GPRS (EGPRS), extended data rate Bluetooth, Wideband Code Division Multiple Access (WCDMA), Wireless LAN (WLAN), Ultra Wideband (UWB), coaxial cable, radar, optical, etc. Further, the invention is not limited for use with a specific PHY or radio type but is applicable to other compatible technologies as well.

Throughout this description, the term communications device is defined as any apparatus or mechanism adapted to transmit, receive or transmit and receive data through a medium. The communications device may be adapted to communicate over any suitable medium such as RF, wireless, infrared, optical, wired, microwave, etc. In the case of wireless communications, the communications device may comprise an RF transmitter, RF receiver, RF transceiver or any combination thereof. Wireless communication involves: radio frequency communication; microwave communication, for example long-range line-of-sight via highly directional antennas, or short-range communication; and/or infrared (IR) short-range communication. Applications may involve point-to-point communication, point-to-multipoint communication, broadcasting, cellular networks and other wireless networks.

As will be appreciated by those skilled in the art, a method, data processing system, or computer program product can embody different examples in accordance with a non-limiting example of the present invention. Accordingly, these portions may take the form of an entirely hardware embodiment, an entirely software embodiment, or an embodiment combining software and hardware aspects. Furthermore, portions may be a computer program product on a computer-usable storage medium having computer readable program code on the medium. Any suitable computer readable medium may be utilized including, but not limited to, static and dynamic storage devices, hard disks, optical storage devices, and magnetic storage devices.

The description as presented below can apply with reference to flowchart illustrations of methods, systems, and computer program products according to an embodiment of the invention. It will be understood that blocks of the illustrations, and combinations of blocks in the illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, implement the functions specified in the block or blocks.

These computer program instructions may also be stored in a computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

For purposes of description, there is now described a prior art communication system relative to FIG. 1, which schematically illustrates signal processing modules or steps of a receiver as part of a communications device that incorporates basic components that can be modified for use in accordance with a non-limiting example of the present invention.

Referring to FIG. 1, the receiver 20 includes an antenna 22 for receiving the signal, a radio receiver filter 24 for limiting the bandwidth of the incoming signal (3 kHz for an HF signal as an example), a digital down-converter 26 for converting a signal from a 1800 Hz carrier to baseband (for the HF signal example), a digital low pass filter 28, a demodulator 30 (with one or more equalizers), a deinterleaver 32, and a decoder 34 for forward error correction. Block interleavers and de-interleavers typically have several different user selectable lengths to allow selection of proper block size for current channel conditions. In accordance with non-limiting examples, filtering could occur prior to demodulation and equalization.

In accordance with a non-limiting example of the present invention, the system and method provides an in-band, narrowband signal such as a communications device break-in message for an emergency hail, alert or high priority message to be simultaneously transmitted or received with a wideband communications signal as an in-band, narrowband communications signal that is inserted within the wideband communications signal. An example of an in-band, narrowband communications signal as an example break-in message could be a 16 kbps frequency shift keyed (FSK), continuously variable slope delta (CVSD) digital voice (DV) signal. Other types of narrowband waveforms used in narrowband communications systems could be supported, of course.

In accordance with a non-limiting example of the present invention, the wideband communications devices such as wideband radios are modified to support simultaneous demodulation of a narrowband communications signal and the wideband communications signal. The transmission of the narrowband communications signal is in-band to the wideband communications channel such that any additional radio frequency filtering and down-conversion chains are not required. Thus, the hardware and signal processing resources can be saved. For example, the processing of a narrowband communications signal and the wideband communications signal can be accomplished within the same Field Programmable Gate Array (FPGA) resources or other processing circuits. Also, the filtering functions can be accomplished in the same FPGA resources (or other processor circuits). These circuits could be incorporated within a software defined radio.

Multiple in-band narrowband channels having the narrowband communications signals can also be supported. For example, two or more narrowband communications signals can be inserted within the wideband communications signal and received within a communications device as a wideband radio and demodulated. A narrowband filter also termed narrowband interference filter (NBI) as an adaptive narrowband excision filter or adaptive filter can be used to preserve the wideband waveform performance such that the wideband waveform continues to work well even when demodulation occurs for both wideband and narrowband communications signals. One channel as the wideband signal channel within the receiver circuitry can filter off the narrowband signals and allow the wideband communications signal waveform to continue to work well while one or more narrowband signal channels are processed to provide demodulation of the narrowband communications channels.

It is also possible for a narrowband break-in message or other emergency or similar message to be checked for authenticity before any action is taken, allowing the radio system to check for the authenticity of a narrowband radio signal. The communications device can also include a power control circuit such that the communications device can respond with a short, confirmation power control message that controls a narrowband radio's transmit power. This is advantageous because the narrowband filter has some limitations under certain jammer-to-signal ratios (JSR) and power control would be advantageous. It is possible to control and set the narrowband radio to the right level so that the overall communications system works well without the interference hurting the wideband waveform performance while also obtaining adequate demodulation out of the narrowband waveform. Different adaptive filters could be used, for example, as described in the non-limiting examples explained below with reference to FIGS. 5 and 6. Additional transmissions can be set for optimal receiver power for the excision filtering and interference minimization.

Figure 2:
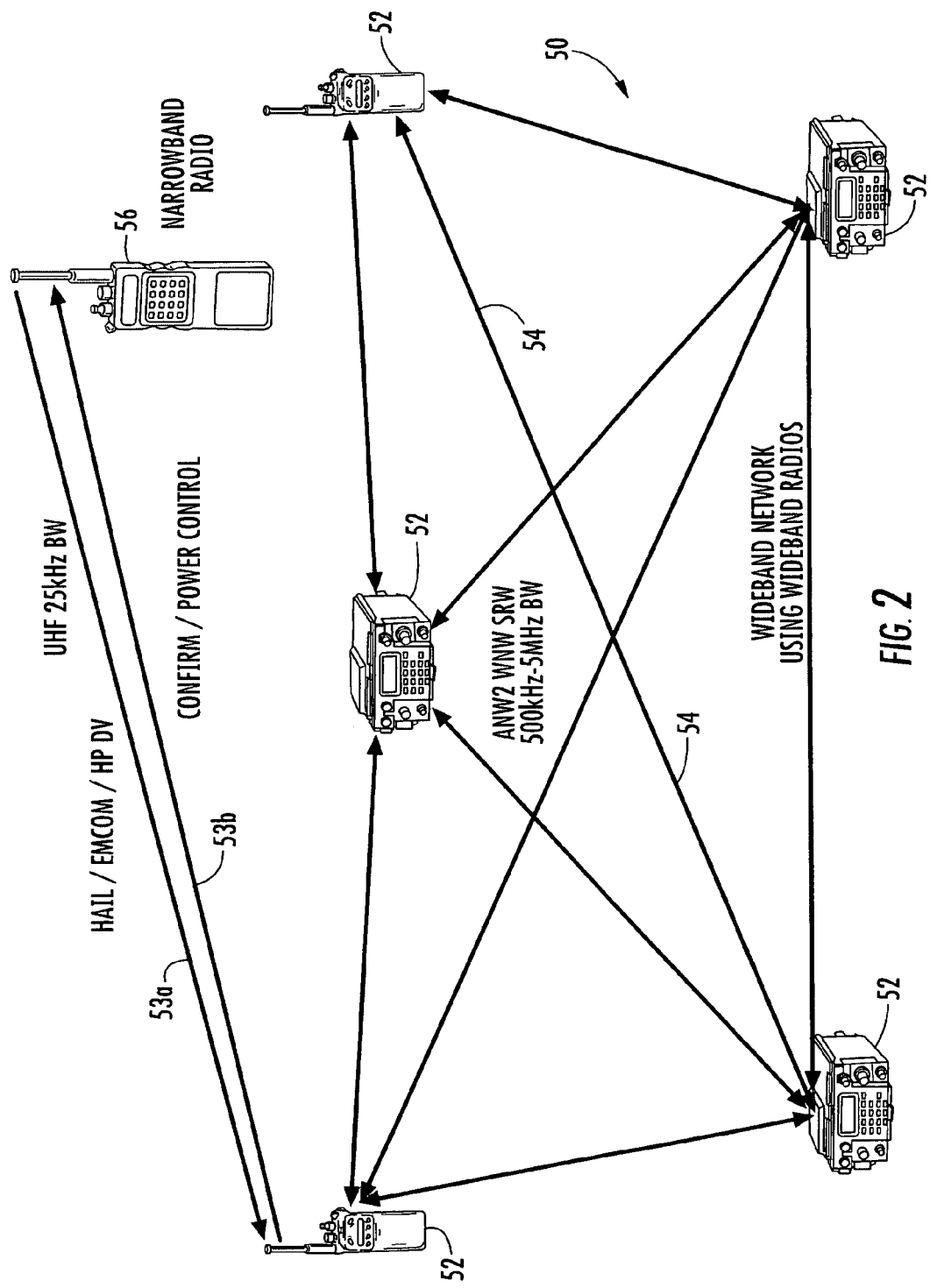
FIG. 2 is a diagram of a wideband communications network showing a number of wideband communications devices as wideband radios operating together and a communications device as a narrowband radio that "breaks" into the wideband communications network with a "hail" or emergency message, and showing a confirmation power control signal transmitted back from a wideband radio to the narrowband radio.

FIG. 2 is a network diagram showing a wideband communications network 50 that includes a number of wideband radios 52 operating such as with the Advanced Networking Wideband Waveform, Wideband Networking Waveform or Soldier Radio Waveform at about 500 kHz to about 5 MHz bandwidth in this non-limiting example. The different communications among the radios 52 forming the wideband communications network are shown by the communications arrows at 54. A narrowband radio 56 is shown operating at a UHF frequency occupying about 25 kHz bandwidth and sends a "hail" or emergency communications or digital voice signal 53a to a radio 52 that operates in the wideband communications network 50. The wideband radio 52 operating in the wideband communications network 50 can send a confirmation signal or power control signal 53b back to the narrowband radio 56. Thus, the radio 52 that is part of the wideband communications network 50 can issue the confirmation or power control while the other wideband radios 52 in the network 50 maintain selected operation as normal.

Figure 3:
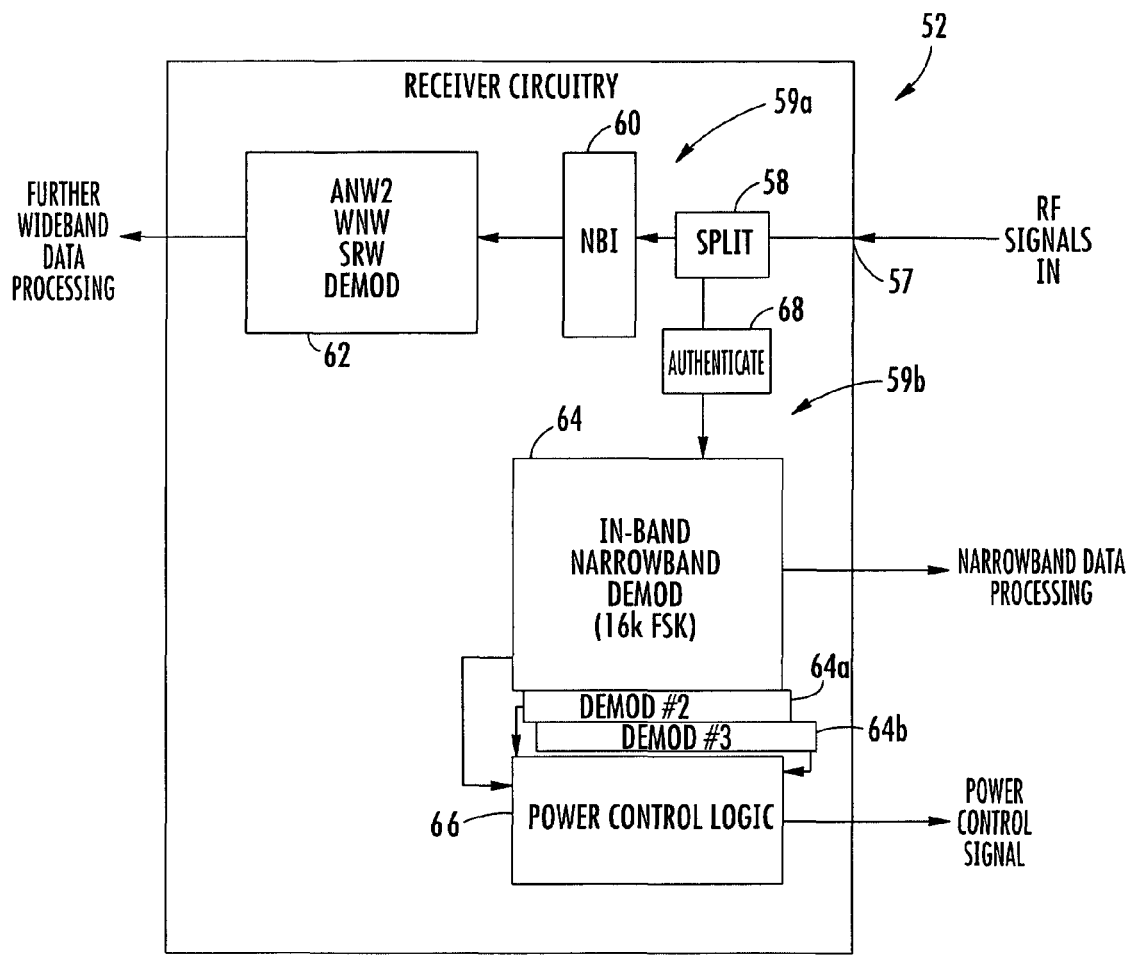
FIG. 3 is a block diagram of a portion of a receiver circuit in the communications device as a wideband radio and showing the narrowband filter and demodulator for the wideband communications signal and the in-band, narrowband demodulator and associated power control logic circuit.
Figure 4:
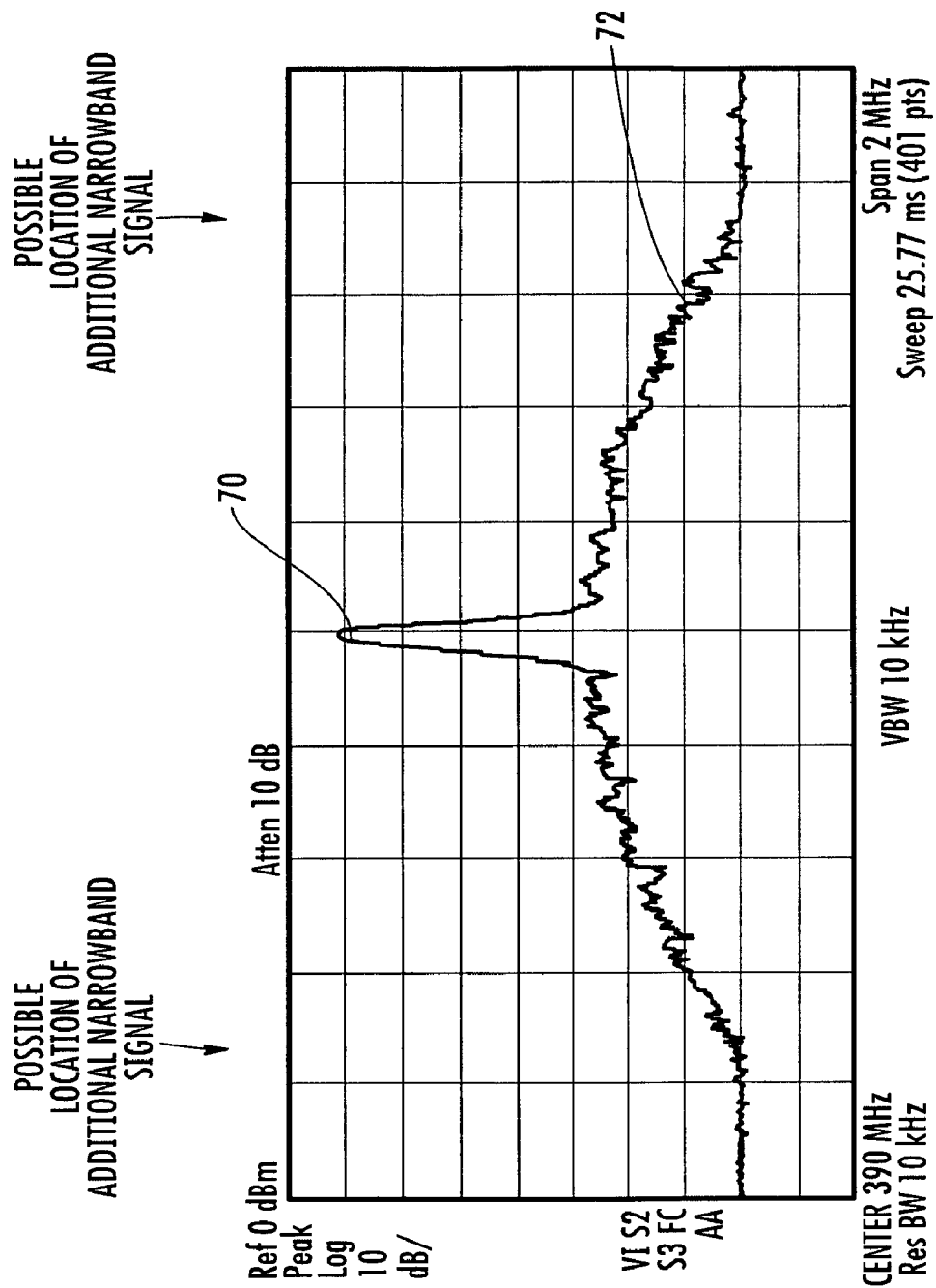
FIG. 4 is a graph showing details of the narrowband communications signal inserted within the same wideband channel as the wideband communications signal that is spread in frequency across the graph.

FIG. 3 is a block diagram of a portion of a receiver circuit in a wideband radio 52 and showing basic components that permit the radio to process simultaneously the wideband communications signals and the narrowband communications signals, which are in-band to the wideband communications channel. The RF communications signal comes through the device input 57 in and is split in the splitter circuit 58 as illustrated. This RF signal includes both the wideband communications signal and one or more narrowband waveform signals in the same channel and frequency band as the wideband waveform signal as shown in the graph of FIG. 4. The spike in the graph of FIG. 4 at 70 shows the narrowband communications signal and the balance of that graph shows the wideband communications signal distributed across the entire frequency band at 72. Other narrowband signals could be inserted as indicated. The communications device radio of FIG. 3 allows both the narrowband and wideband communications signals to be demodulated without replicating a full radio circuit. An adaptive narrowband filter as explained below can be used to minimize the distortion to the wideband communications signal so that wideband networking communications can continue to operate without hindrance.

As illustrated, the RF signals that include both the wideband communications signal and the in-band, narrowband communications signals are split in two by the splitter circuit. Signals pass through a wideband signal channel 59a and narrowband signal channel 59b. The signal in the wideband signal channel 59a passes through the narrowband interference filter 60 as a narrowband excision filter, which excises or removes the narrowband communications signal or signals. The wideband signal demodulator 62 demodulates the wideband communications signal and extracts wideband data for later processing. The split signal before it enters the narrowband excision filter 60 passes through the in-band, narrowband demodulator 64 positioned in the narrowband signal channel 59b, such as for processing and demodulating 16k Frequency Shift Keying (FSK) signals. The narrowband communications data is output for further processing as illustrated. The signal from the in-band, narrowband demodulator 64 is also processed through a power control logic circuit 66 to produce a power control signal that can be transmitted back to the narrowband radio for optimizing the communications system as noted above. An authentication circuit 68 can authenticate a narrowband radio before further processing. Also, if multiple in-band, narrowband communications signals are received, multiple in-band, narrowband demodulators 64a, 64b can be employed in multiple narrowband signal channels, for example.

The narrowband excision filter 60 shown in FIG. 3 can be formed as an adaptive filter, e.g., a narrowband interference (NBI) (or narrowband) filter as shown in detail in FIGS. 5 and 6 and further explained below. Although an adaptive filter as a Finite Impulse Response (FIR) filter is preferred, the adaptive filter could be formed as an Infinite Impulse Response (IIR) filter. In one embodiment, an additional variable delay between the fixed and adaptive taps is included. This delay improves multipath performance by making the multipath resolvable for the channel estimation algorithms and equalizers used in demodulator circuit. Because the input power of the adaptive filter relative to the output power of the adaptive filter is a good indicator of interference suppression, this power can be measured and information fed back to control a variable delay before the adaptive taps and to control an automatic tap order selection circuit.

A large single interferer or jammer is often best handled by one or two taps (less taps reduces ISI introduced by adaptive filter), and the number of taps can be chosen or updated to accommodate signal changes, such as the appearance of a large interferer or jammer. The adaptive filter uses the state of the receive modem (i.e. demodulator) to select an adaptive update gain, while a variable delay is placed between the fixed and adaptive taps. An automatic application of the adaptive filter can be based on the measured output power by bypassing the adaptive filter or selecting the output of the adaptive filter. The tap order selection can be based automatically on the modulation of the data portion of waveform and the adaptive filter state. The variable adaptive gain can be based on the demodulator state such as the preamble search, preamble, data and also on the waveform modulation of data portion of waveform.

Selected non-limiting parameters can include a gain with the variables of $½^7$, $½^3$ and $½^{10}$, and the total number of taps can vary from as few as one to about 3 to 6 in a non-limiting example. The number of adaptive taps can vary from 1 to 4 in another non-limiting example. The system provides multiple, delayed taps (spaced at the symbol rate of modulated waveform) that are adaptive after a first fixed tap in one embodiment and an automatic in/out filter selection based on the output power of the adaptive filter. The order or number of taps can be automatically selected based on the output power of the adaptive filter. An adaptive update gain can be based on the receive state of the modem, including the search, preamble and data and the modulation such as GMSK (Gaussian Minimum Shift Keying), BPSK (Binary Phase Shift Keying), QPSK (Quadrature Phase Shift Keying), M-PSK (M-ary Phase Shift Keying) and M-QAM (M-ary Quadrature Amplitude Modulation, i.e. 16-QAM).

It should be understood that the adaptive filter uses the characteristics of the input signal. Typically, the adaptive filter, for example, an adaptive FIR filter, has a self-learning process and the adaptive algorithm is selected to reduce the error between the output signal and a desired signal. One algorithm is the Least Mean Squares (LMS) algorithm that approximates the steepest descent algorithm to use an instantaneous estimate of a gradient vector of a cost function. It should be understood that other algorithms such as RLS or MMSE algorithms can be used. For description, the LMS algorithm is described as a non-limiting example.

In the LMS algorithm, the estimate of the gradient is based on sample values of a tap-input vector and an error signal. The algorithm iterates over each coefficient in the filter, moving it in the direction of the approximated gradient. The LMS performance achieves its minimum value through the iterations of the adapting algorithm and the adaptive filter is finished when the coefficients converge to a solution such that the output from the filter matches the desired signal. When the input data characteristics such as the filter environment are changed, the filter adapts to the new environment by generating a new set of coefficients for new data.

When the LMS algorithm is used in an equalizer structure, the LMS algorithm uses a reference signal representing the desired filter output and the difference between the reference signal and the output of the filter is an error signal. Thus, the LMS algorithm finds a set of filter coefficients that minimizes the expected value of a quadratic error signal to achieve the least mean squared error. In many systems, the squared error is a quadratic function of the coefficient vector and there is typically a global minimum and no local minima.

Thus, the filter changes or adapts its parameters in response to changes in the operating environment such that the output can track a reference signal with minimum error as coefficients are changed. The equalizer can be operated in a training mode and a tracking mode. Channel characteristics can be learned for a first time in a training mode, while in the tracking mode, the characteristics of the channel are followed, assuming they do not change quickly. A specially chosen training signal could be applied to the channel input and is presumed to be known to the equalizer. In a tracking mode, while actual communication occurs, the signal is unknown to the equalizer.

Figure 5:
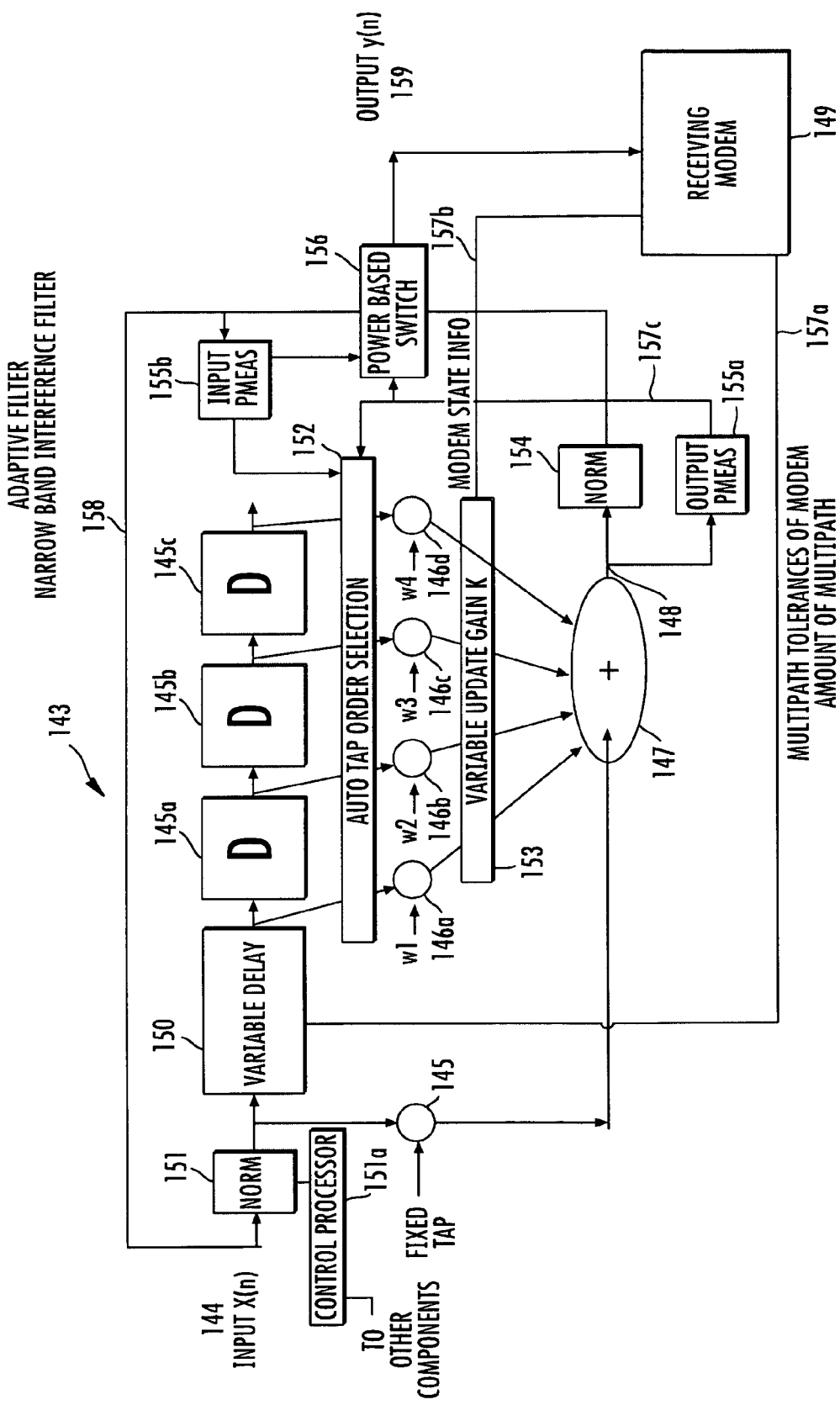
FIG. 5 is a block diagram of an adaptive filter that can be used in the wideband communications devices shown in FIGS. 2 and 3 in accordance with a non-limiting example of the present invention.

FIG. 5 illustrates a block diagram of an adaptive filter 143 for use in various examples of the wideband communications device 52 as described. An example of such adaptive filter is also set forth in commonly assigned U.S. patent application Ser. Nos. 11/871,174; 11/871,184; 11/871,208; 11/871,224; 11/871,203; 11/871,180; and 11/871,189; the disclosures which are hereby incorporated by reference in their entirety. Although the filter is illustrated as a Finite Impulse Response (FIR) Filter, it can be designed as an Infinite Impulse Response (IIR) filter. The adaptive filter 143 includes an input X(n) 144 and appropriate delay elements 145a-c (illustrated as three delay elements) and four weighted taps 146a-d and outputs that are summed within a summer 147. Other delay elements with appropriate weighted coefficients can possibly be used. A fixed tap 145 is included as illustrated before adaptive taps and could include one or more fixed taps, typically one. The output Y(n) 148 from the summer 147 is subsequently received within a receiving modem 149.

In accordance with a non-limiting example, a variable delay circuit 150 is incorporated between fixed and adaptive taps as illustrated. The input 144 is also passed through an input normalizer circuit 151 that can be controlled by a control processor 151a before reaching the variable delay circuit 150. An automatic tap order selection circuit 152 is incorporated within the filter as well as a variable update gain circuit 153. From the summer 147, the output 148 is passed through an output normalizer circuit 154, which can be controlled by the control processor 151a, and an output power measuring circuit 155a. Input power can be measured at an input power measuring circuit 155b. A power-based switch 156 at the output allows the input signal 144 to be switched either directly to the receiving modem 149 or through the adaptive filter by means of a bypass channel 158.

The receiving modem 149 can include a feedback channel 157a to carry information concerning the multipath tolerances of the modem and information about the amount of multipath back to the variable delay circuit 150. The power-based switch 156 allows switching between the filter and the input as illustrated. Modem state information as explained below is fed back through a feedback channel 157b to the variable update gain circuit 153. The power measuring circuit 155a feeds back information regarding the power output from the filter to the power-based switch 156 and the automatic tap order selection circuit 152 through feedback channel 157c. Input power as measured by power measuring circuit 155b is fed to the automatic tap order selection circuit 152 and power-based switch 156.

A delay can be provided between the fixed and adaptive taps to improve multipath performance and make the multipath resolvable. Because the input power and output power of the filter is a good indicator of the interference suppression, the filter can be automatically applied based on the output power while automatic tap order selection occurs based on modulation used for data and the filter state. The power based switch permits automatic selection of the signal path either through the filter or through a bypass channel 158 to an output 159 as illustrated. The filter also automatically determines an optimum number of adaptive taps dependent on the filter performance and modulation and can adjust the update gain of the filter based on the modem state, data modulation, etc.

The variable delay circuit 150 makes the multipath more discernable and differentiates multipath when it is next to each other by separating the multipath because the equalizer function as a whole tends to perform better if there is greater spacing between the multipath (as long as multipath does not exceed multipath capability of equalizer or channel estimation algorithms). The automatic tap order selection circuit 152 recognizes that it is possible to perform the job with a required number of taps, for example, one or two taps, which may be better suited for different jamming or interfering signals. It is possible to select one or the other or more, or any combination. This structure and function is advantageous if the system is attempting to remove one or two different jamming signals. Thus, the minimum number of taps can be used effectively.

The power measuring circuit 155 feeds back power information into the automatic tap order selection circuit 152, allowing the number of taps to be chosen based on the power output of the filter. Power is a good metric or indicator of how well the filter is working and how much suppression is actually obtained. This can be obtained by measuring the ratio of the output power to the input power, giving an indicator whether the filter is removing jammers. It is possible to look at these relative powers and decide which one of the taps (filters), such as the one or two taps, is the best one to choose.

The variable update gain circuit 153 permits updating of the taps by obtaining feedback of demodulator state information from the receiving modem through the feedback channel 157b. This information allows an adaptive update gain based on the received state of the modem (i.e. whether demodulator is in the preamble search state, preamble state and data state) and the type of modulation used to carry data, such as GMSK, BPSK, QPSK, M-PSK and M-QAM.

As noted before, the power based switch 156 switches the signal between the bypass and the filter output. For example, if the output power is about the same as the input power, the filter is not accomplishing any real suppression and the switch is operable such that the signal is bypassed into the top bypass channel 158 from the input through the power based switch 156 and output to the receiving modem 149. If the filter is operative as measured by the ratio of output power and input power using the power measuring circuit 155, the input signal is switched through the filter 143 and into the output 148 of the summer 143 and through the normalizer 154 and power measuring circuit 155. This switching function can be advantageous because even when the filter is not accomplishing much suppression, the waveform and any noise at the taps will still cause the taps to "jump" or move even a small amount and there is still some distortion imparted to the received signal. Thus, a high-level decision can occur whether the filter should be used or not.

As to the demodulator state information that is fed back to the variable update gain circuit 157 through the channel 157b, it is possible to operate the filter with different gains or different internals depending on the state of the demodulator. Typically, a demodulator will search for a waveform and will run with a particular updated gain function while searching. Once the waveform is detected, it might be possible to slow down the adaptation rate so that the system does not overmodulate or severely distort the received signal. The amount of "jumping" by the taps is decreased. For example, it is possible to run at first with a larger gain (i.e. faster adaptation), but once a signal is acquired, the gain can be made smaller (i.e. slower adaptation by using a smaller gain) so there will be less noise enhancement from the adapting filter taps.

The variable delay 150 at the front end of the adaptive filter 143 gives some separation to the multipath. The feedback from the modem allows information regarding the receiving modem's multipath tolerances and the amount of multipath and allows an adjustment in the delay such that the multipath will not become so large in its separation and extend beyond the functional multipath capability of the receiving modem 149.

In the system for each input, sample $y(n)=x(n)-w1*x(n-2-v)-w2*x(n-3-v)-w3*x(n-4-v)-w4*x(n-5-v)$. Taps are updated with each sample $w(i)=w(i)+k*x(n-i)*y(n)*$. The input/output and taps are all complex.

The normalizing circuits 151,154 receive inputs and feedback from a control or other processor and are operable with a fixed point arithmetic or logic for normalized input and output. For example, if there is a 20 dB jammer, the signal coming out of the filter will be a factor of about 100 smaller, and if using fixed-point math precision, it can be brought back up to obtain more bits and increase the gain of the samples to work better through the system. The input normalizing circuit 151 obtains sample values coming into the filter and attempts to place them in the proper range for filter fixed-point math functions to work without complicating issues.

The amount of normalizing is adjusted from a controller or other processor such that the normalizing function does not modulate data beyond what is desired. This is important depending on the type of waveform, such as a M-PSK constellation, constant amplitude waveform, or a M-QAM constellation. The controller or other processor could operate with a memory function to remember the last gain given to the samples coming out of the normalizing circuit, including the input and output normalizing circuits 151, 154, allowing a small change relative to the signal. It is possible to allow an automatic gain control (AGC) circuit to make some changes on a sample or block basis. There are some sensitivities to changes in amplitude and the normalizing circuits are operable that any M-QAM signal having data or information contained in the amplitude of the waveform is not affected. Any AGC loop could be on both the memory and the input and output normalizing circuits. Any control signal from a controller or other processor could include information relating to the modulation type and demodulator state.

Overall, the adaptive filter will accomplish better performance if there is greater spacing between the multipath and the variable delay circuit 150 provides such spacing. If only the first tap is used, for example, when the variable delay circuit 150 is not operable, the multipath tends to group together and the taps can move to a non-zero value if there is an interferer. As illustrated and as noted before, there are three or four taps in the filter operable to attack three or four interferers. If only one or two taps are desired and used such that the number of taps are reduced, then the multipath spread introduced by adaptive filter is less since it had to remove fewer interferers or jammers.

It should be understood that as part of the demodulation process, a faster filter update gain can be used for the preamble search and preamble state of demodulator. The preamble portion of waveform tends to be less susceptible to waveform variation and to gain variations of the adaptive taps than the data portion of waveform, and thus, once the demodulator detects a preamble, it could slow down the adaptation rate of filter taps through the feedback mechanism so that the filter adaptation is slower for the data portion of waveform. With feedback from the demodulator, the adaptive filter can adjust the gain of the filter taps as desired by the state of demodulator.

The automatic tap order selection circuit 152 takes advantage of the fact that there is not necessarily a requirement to use four taps, but three, two or one tap can be used to overcome the disadvantages of a fixed structure.

Typically, the filters as described can be implemented within a Field Programmable Gate Array (FPGA) that is fast enough to implement the modem functions of the waveform. With the improvement in digital signal processors, however, various DSP circuits could also be used.

The filter function can be implemented in C code (or assembly language) to establish a narrowband interference (NBI) adaptive filter as either a FIR or IIR filter. Different variables can be defined, including channel buffers, complex demodulation, and power output sums. Filter state and filter taps are tracked as well as the gain, number of taps, and number of adapted taps. As the filter state is tracked, the output power with the adaptive taps is updated.

The C code can define if the modem is in a search mode, for example, searching for a waveform such as a M-QAM, M-PSK or GMSK waveform for tracking the filter. The update gain of the filter can be adjusted based on the demodulator state. Also, the variable delay is implemented by defining the number of taps and the number of adaptive taps and the difference can be the delay between a first fixed tap and the first adaptive tap. This can be implemented in C code, for example. The filter state values can be shuffled to make room for a next input. The C code can also define the output power relative to the input power to allow interference reduction and automatically select the filter operation by bypassing into the output or through the filter using the switch.

Figure 6:
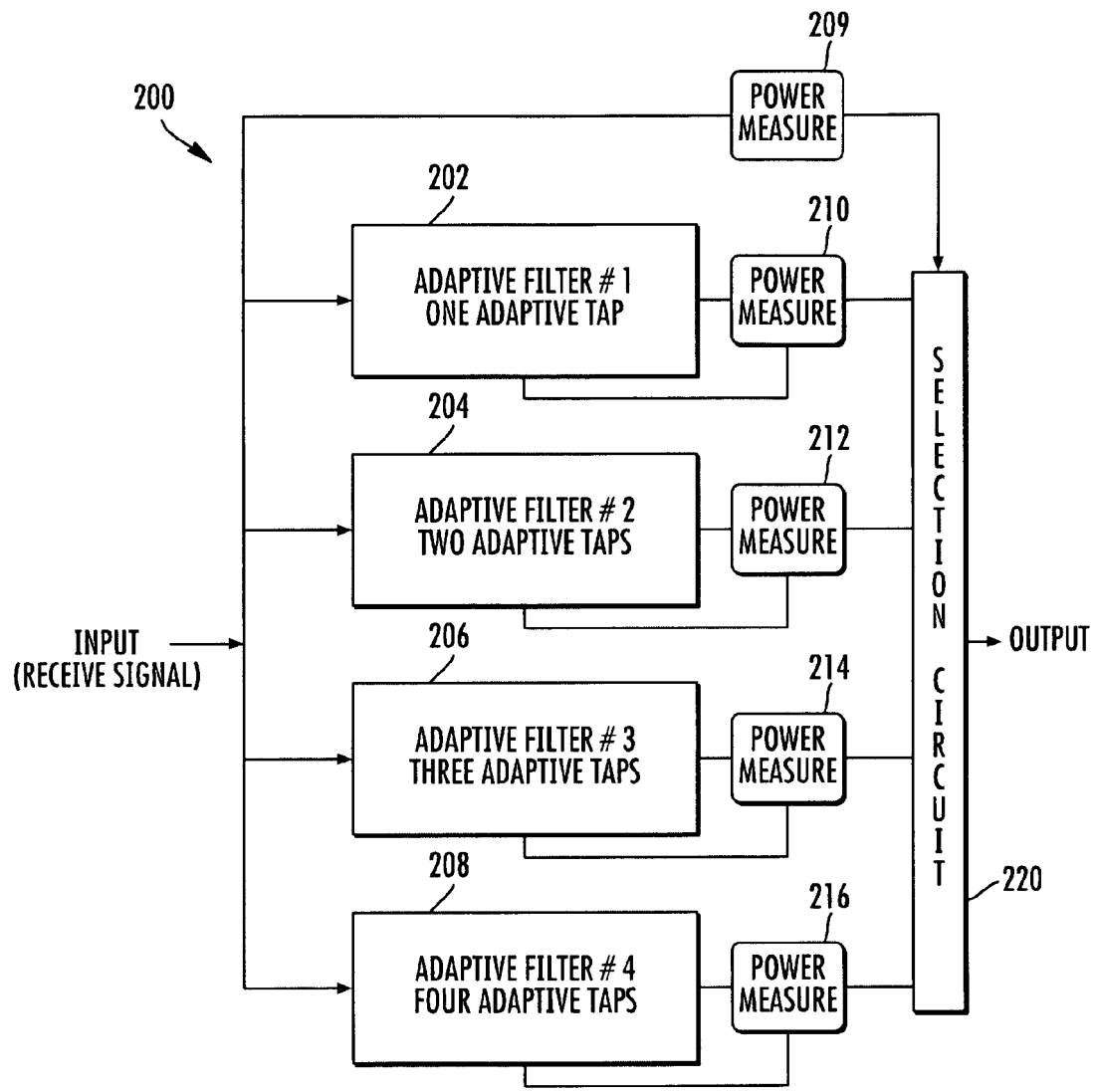
FIG. 6 is a block diagram showing a plurality of adaptive filters in parallel that can be used in the wideband communications devices of FIGS. 2 and 3, each having a different number of adaptive taps such that the filter with smallest output power or most suppression or other criterion is selected as an output.

FIG. 6 is an adaptive filter system or circuit 200 having four adaptive filters 202, 204, 206, and 208 positioned parallel. The first adaptive filter 202 has one adaptive tap. The second adaptive filter 204 has two adaptive taps. The third adaptive filter 206 has three adaptive taps. The fourth adaptive filter 208 has four adaptive taps. A power measuring circuit 209 measures the input power. Each adaptive filter has a respective power measuring circuit 210, 212, 214, and 216 with appropriate feedback of the type as mentioned relative to FIG. 2. The adaptive filters and power measuring circuit are shown in basic diagrammatic view only. Each power measuring circuit is output into a selection circuit 220 for final output. The received signal is input into each adaptive filter. The selection circuit 220 senses the output power from each adaptive filter and selects the adaptive filter with the most suppression or smallest output power as the adaptive filter to use as the output in the circuit 200.

It is possible that the system provides multiple delay taps and a variable delay at the front-end such that the first few taps do not have to be used while different delays can be used. A "one" can be used for the first filter tap and some filter taps can be skipped. The output power can be monitored as noted before such that the filter determines which branch to use and whether the input signal should be bypassed directly to output into the filter. The filter can operate with different filter taps, for example, a filter with 1, 2, 3 or 4 taps, while the power output can be monitored to determine which branch to use as noted before. The gain of the filter can be adapted based on whether the system is searching such as for a waveform and whether the system is in a preamble mode or data mode and whether a certain modulation is used. Depending on the type of signal constellation used to transmit data, much of the transmitted information is in the phase and not the amplitude (i.e. M-PSK), and thus, the system would be less likely to be hurt by faster filter update gains. If the system knows it will receive a M-QAM constellation, it could consider slowing the filter update gain and increase normalizing circuit memory after the preamble, and thus, the system can exploit what knowledge it has.

For purposes of description, some background information on coding, interleaving, and an exemplary wireless, mobile radio communications system that includes ad-hoc capability and can be modified for use is set forth. This example of a communications system that can be used and modified for use with the present invention is now set forth with regard to FIGS. 7 and 8.

An example of a radio that could be used with such system and method is a Falcon™ III radio manufactured and sold by Harris Corporation of Melbourne, Fla. This type of radio can support multiple wavebands form 30 MHz up to 2 GHz, including L-band SATCOM and MANET. The waveforms can provide secure IP data networking. It should be understood that different radios can be used, including software defined radios that can be typically implemented with relatively standard processor and hardware components. One particular class of software radio is the Joint Tactical Radio (JTR), which includes relatively standard radio and processing hardware along with any appropriate waveform software modules to implement the communication waveforms a radio will use. JTR radios also use operating system software that conforms with the software communications architecture (SCA) specification (see www.jtrs.saalt.mil), which is hereby incorporated by reference in its entirety. The SCA is an open architecture framework that specifies how hardware and software components are to interoperate so that different manufacturers and developers can readily integrate the respective components into a single device.

The Joint Tactical Radio System (JTRS) Software Component Architecture (SCA) defines a set of interfaces and protocols, often based on the Common Object Request Broker Architecture (CORBA), for implementing a Software Defined Radio (SDR). In part, JTRS and its SCA are used with a family of software re-programmable radios. As such, the SCA is a specific set of rules, methods, and design criteria for implementing software re-programmable digital radios.

The JTRS SCA specification is published by the JTRS Joint Program Office (JPO). The JTRS SCA has been structured to provide for portability of applications software between different JTRS SCA implementations, leverage commercial standards to reduce development cost, reduce development time of new waveforms through the ability to reuse design modules, and build on evolving commercial frameworks and architectures.

The JTRS SCA is not a system specification, as it is intended to be implementation independent, but a set of rules that constrain the design of systems to achieve desired JTRS objectives. The software framework of the JTRS SCA defines the Operating Environment (OE) and specifies the services and interfaces that applications use from that environment. The SCA OE comprises a Core Framework (CF), a CORBA middleware, and an Operating System (OS) based on the Portable Operating System Interface (POSIX) with associated board support packages. The JTRS SCA also provides a building block structure (defined in the API Supplement) for defining application programming interfaces (APIs) between application software components.

The JTRS SCA Core Framework (CF) is an architectural concept defining the essential, "core" set of open software Interfaces and Profiles that provide for the deployment, management, interconnection, and intercommunication of software application components in embedded, distributed-computing communication systems. Interfaces may be defined in the JTRS SCA Specification. However, developers may implement some of them, some may be implemented by non-core applications (i.e., waveforms, etc.), and some may be implemented by hardware device providers.

Figure 7:
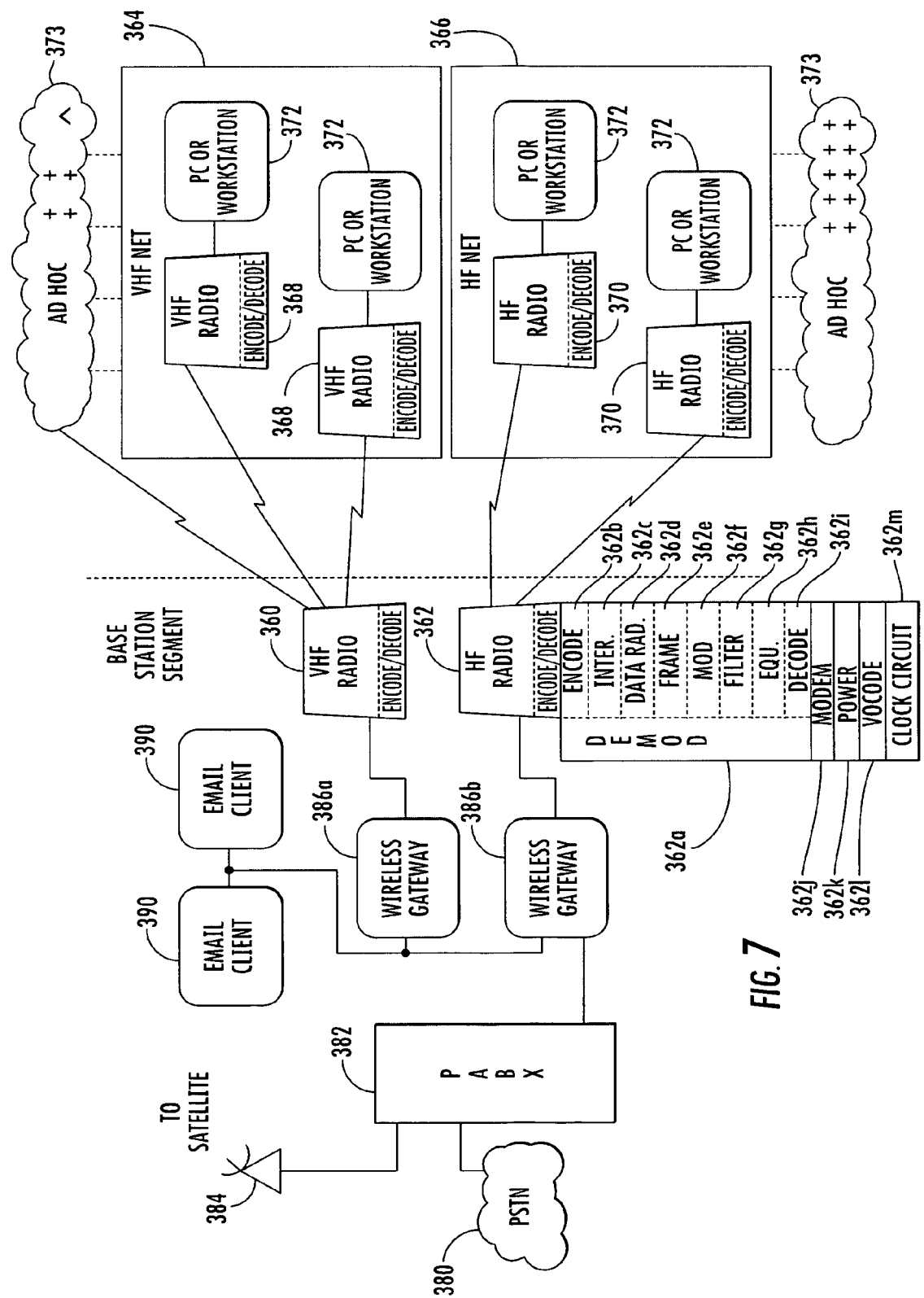
FIG. 7 is a block diagram of an example of a communications system that can be used and modified in accordance with a non-limiting example of the present invention.

For purposes of description only, a brief description of an example of a communications system that includes communications devices that incorporate the simultaneous wideband and narrowband communications in accordance with a non-limiting example, is described relative to a non-limiting example shown in FIG. 7. This high-level block diagram of a communications system includes a base station segment and wireless message terminals that could be modified for use with the present invention. The base station segment includes a VHF radio 360 and HF radio 362 that communicate and transmit voice or data over a wireless link to a VHF net 364 or HF net 366, each which include a number of respective VHF radios 368 and HF radios 370, and personal computer workstations 372 connected to the radios 368,370. Ad-hoc communication networks 373 are interoperative with the various components as illustrated. The entire network can be ad-hoc and include source, destination and neighboring mobile nodes. Thus, it should be understood that the HF or VHF networks include HF and VHF net segments that are infrastructure-less and operative as the ad-hoc communications network. Although UHF and higher frequency radios and net segments are not illustrated, these could be included.

The radio can include a demodulator circuit 362a and appropriate convolutional encoder circuit 362b, block interleaves 362c, data randomizer circuit 362d, data and framing circuit 362e, modulation circuit 362f, matched filter circuit 362g, block or symbol equalizer circuit 362h with an appropriate clamping device, deinterleaver and decoder circuit 362i modem 362j, and power adaptation circuit 362k as non-limiting examples. A vocoder circuit 362l can incorporate the decode and encode functions and a conversion unit could be a combination of the various circuits as described or a separate circuit. A clock circuit 362m can establish the physical clock time and through second order calculations as described below, a virtual clock time. The network can have an overall network clock time. These and other circuits operate to perform any functions necessary for the present invention, as well as other functions suggested by those skilled in the art. Other illustrated radios, including all VHF (or UHF) and higher frequency mobile radios and transmitting and receiving stations can have similar functional circuits. Radios could range from 30 MHz to about 2 GHz as non-limiting examples.

The base station segment includes a landline connection to a public switched telephone network (PSTN) 380, which connects to a PABX 382. A satellite interface 384, such as a satellite ground station, connects to the PABX 382, which connects to processors forming wireless gateways 386a, 386b. These interconnect to the VHF radio 360 or HF radio 362, respectively. The processors are connected through a local area network to the PABX 382 and e-mail clients 390. The radios include appropriate signal generators and modulators.

An Ethernet/TCP-IP local area network could operate as a "radio" mail server. E-mail messages could be sent over radio links and local air networks using STANAG-5066 as second-generation protocols/waveforms, the disclosure which is hereby incorporated by reference in its entirety and, of course, preferably with the third-generation interoperability standard: STANAG-4538, the disclosure which is hereby incorporated by reference in its entirety. An interoperability standard FED-STD-1052, the disclosure which is hereby incorporated by reference in its entirety, could be used with legacy wireless devices. Examples of equipment that can be used in the present invention include different wireless gateway and radios manufactured by Harris Corporation of Melbourne, Fla. This equipment could include RF5800, 5022, 7210, 5710, 5285 and PRC 117 and 138 series equipment and devices as non-limiting examples.

These systems can be operable with RF-5710A high-frequency (HF) modems and with the NATO standard known as STANAG 4539, the disclosure which is hereby incorporated by reference in its entirety, which provides for transmission of long distance radio at rates up to 9,600 bps. In addition to modem technology, those systems can use wireless email products that use a suite of data-link protocols designed and perfected for stressed tactical channels, such as the STANAG 4538 or STANAG 5066, the disclosures which are hereby incorporated by reference in their entirety. It is also possible to use a fixed, non-adaptive data rate as high as 19,200 bps with a radio set to ISE mode and an HF modem set to a fixed data rate. It is possible to use code combining techniques and ARQ.

Figure 8:
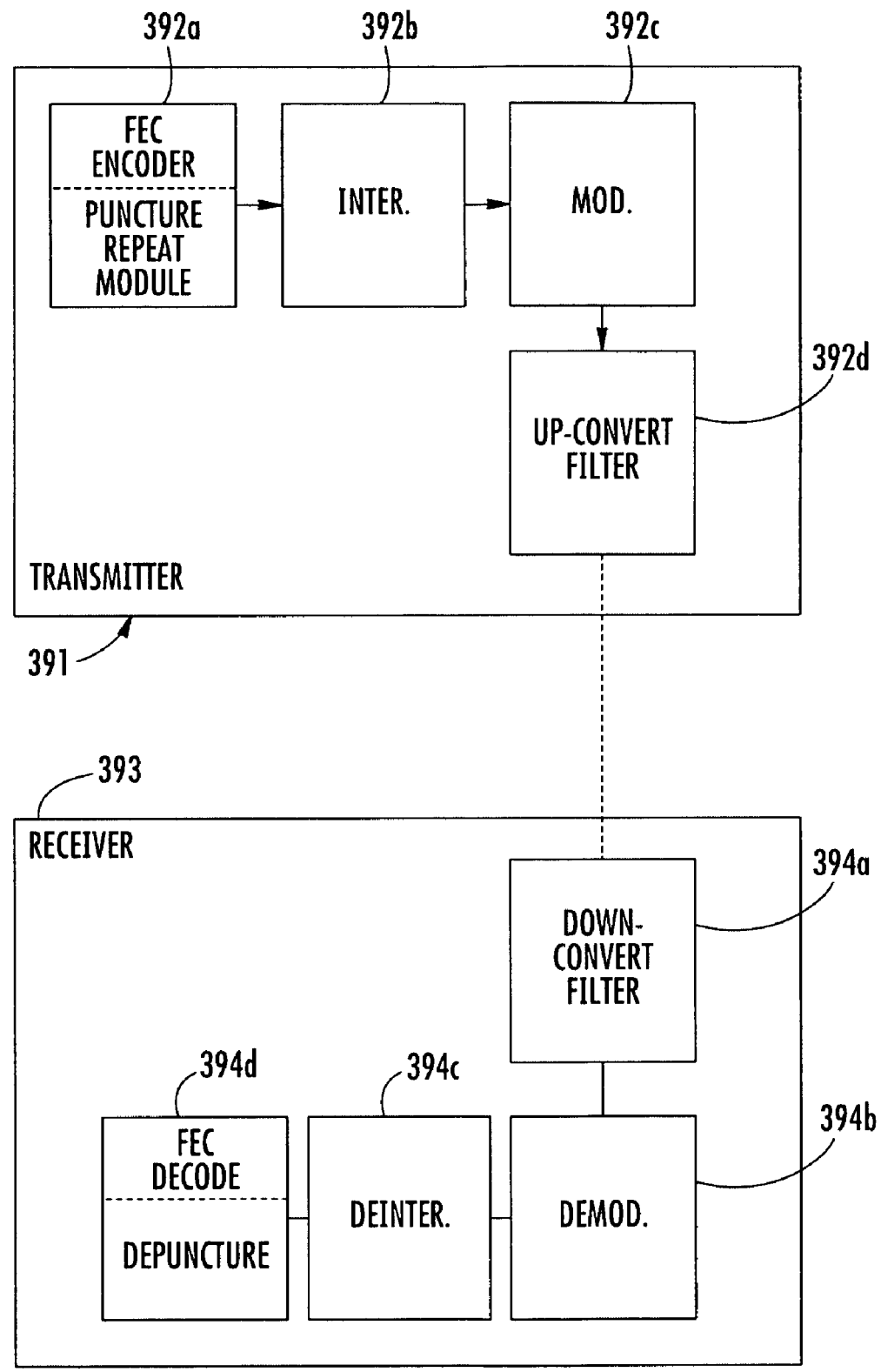
FIG. 8 is a high-level block diagram showing basic components that can be used and modified in accordance with a non-limiting example of the present invention.

A communications system that incorporates communications devices can be used in accordance with non-limiting examples of the present invention and is shown in FIG. 8. A transmitter is shown at 391 and includes basic functional circuit components or modules, including a forward error correction encoder 392a that includes a puncturing module, which could be integral to the encoder or a separate module. The decoder 392a and its puncturing module includes a function for repeating as will be explained below. Encoded data is interleaved at an interleaver 392b, for example, a block interleaver, and in many cases modulated at modulator 392c. This modulator can map the communications data into different symbols based on a specific mapping algorithm to form a communications signal. For example, it could form Minimum Shift Keying or Gaussian Minimum Shift Keying (MSK or GMSK) symbols. Other types of modulation could be used in accordance with non-limiting examples of the present invention. Up-conversion and filtering occurs at an up-converter and filter 392d, which could be formed as an integrated module or separate modules. Communications signals are transmitted, for example, wirelessly to receiver 393.

At the receiver 393, down conversion and filtering occurs at a down converter and filter 394a, which could be integrated or separate modules. The signal is demodulated at demodulator 394b and deinterleaved at deinterleaver 394c. The deinterleaved data (i.e. bit soft decisions) is decoded and depunctured (for punctured codes), combined (for repeated codes) and passed through (for standard codes) at decoder 394d, which could include a separate or integrated depuncturing module. The system, apparatus and method can use different modules and different functions. These components as described could typically be contained within one transceiver.

It should be understood, in one non-limiting aspect of the present invention, a rate ½, K=7 convolutional code can be used as an industry standard code for forward error correction (FEC) during encoding. For purposes of understanding, a more detailed description of basic components now follows. A convolutional code is an error-correcting code, and usually has three parameters (n, k, m) with n equal to the number of output bits, k equal to the number of input bits, and m equal to the number of memory registers, in one non-limiting example. The quantity k/n could be called the code rate with this definition and is a measure of the efficiency of the code. K and n parameters can range from 1 to 8, m can range from 2 to 10, and the code rate can range from ⅛ to ⅞ in non-limiting examples. Sometimes convolutional code chips are specified by parameters (n, k, L) with L equal to the constraint length of the code as L=k (m−1). Thus, the constraint length can represent the number of bits in an encoder memory that would affect the generation of n output bits. Sometimes the letters may be switched depending on the definitions used.

The transformation of the encoded data is a function of the information symbols and the constraint length of the code. Single bit input codes can produce punctured codes that give different code rates. For example, when a rate ½ code is used, the transmission of a subset of the output bits of the encoder can convert the rate ½ code into a rate ⅔ code. Thus, one hardware circuit or module can produce codes of different rates. Punctured codes allow rates to be changed dynamically through software or hardware depending on channel conditions, such as rain or other channel impairing conditions.

An encoder for a convolutional code typically uses a look-up table for encoding, which usually includes an input bit as well as a number of previous input bits (known as the state of the encoder), the table value being the output bit or bits of the encoder. It is possible to view the encoder function as a state diagram, a tree diagram or a trellis diagram.

Decoding systems for convolutional codes can use 1) sequential decoding, or 2) maximum likelihood decoding, also referred to as Viterbi decoding, which typically is more desirable. Sequential decoding allows both forward and backward movement through the trellis. Viterbi decoding as maximum likelihood decoding examines a receive sequence of given length, computes a metric for each path, and makes a decision based on the metric.

Puncturing convolutional codes is a common practice in some systems and is used in accordance with non-limiting examples of the present invention. It should be understood that in some examples a punctured convolutional code is a higher rate code obtained by the periodic elimination of specific code bits from the output of a low rate encoder. Punctured convolutional code performance can be degraded compared with original codes, but typically the coding rate increases.

Some of the basic components that could be used as non-limiting examples of the present invention include a transmitter that incorporates a convolutional encoder, which encodes a sequence of binary input vectors to produce the sequence of binary output vectors and can be defined using a trellis structure. An interleaver, for example, a block interleaver, can permute the bits of the output vectors. The interleaved data would also be modulated at the transmitter (by mapping to transmit symbols) and transmitted. At a receiver, a demodulator demodulates the signal.

A block deinterleaver recovers the bits that were interleaved. A Viterbi decoder could decode the deinterleaved bit soft decisions to produce binary output data.

Often a Viterbi forward error correction module or core is used that would include a convolutional encoder and Viterbi decoder as part of a radio transceiver as described above. For example if the constraint length of the convolutional code is 7, the encoder and Viterbi decoder could support selectable code rates of ½, ⅔, ¾, ⅘, ⅚, 6/7, ⅞ using industry standard puncturing algorithms.

Different design and block systems parameters could include the constraint length as a number of input bits over which the convolutional code is computed, and a convolutional code rate as the ratio of the input to output bits for the convolutional encoder. The puncturing rate could include a ratio of input to output bits for the convolutional encoder using the puncturing process, for example, derived from a rate ½ code.

The Viterbi decoder parameters could include the convolutional code rate as a ratio of input to output bits for the convolutional encoder. The puncture rate could be the ratio of input to output bits for the convolutional encoder using a puncturing process and can be derived from a rate ½ mother code. The input bits could be the number of processing bits for the decoder. The Viterbi input width could be the width of input data (i.e. soft decisions) to the Viterbi decoder. A metric register length could be the width of registers storing the metrics. A trace back depth could be the length of path required by the Viterbi decoder to compute the most likely decoded bit value. The size of the memory storing the path metrics information for the decoding process could be the memory size. In some instances, a Viterbi decoder could include a First-In/First-Out (FIFO) buffer between depuncture and Viterbi function blocks or modules. The Viterbi output width could be the width of input data to the Viterbi decoder.

The encoder could include a puncturing block circuit or module as noted above. Usually a convolutional encoder may have a constraint length of 7 and take the form of a shift register with a number of elements, for example, 6. One bit can be input for each clock cycle. Thus, the output bits could be defined by a combination of shift register elements using a standard generator code and be concatenated to form an encoded output sequence. There could be a serial or parallel byte data interface at the input. The output width could be programmable depending on the punctured code rate of the application.

A Viterbi decoder in non-limiting examples could divide the input data stream into blocks, and estimate the most likely data sequence. Each decoded data sequence could be output in a burst. The input and calculations can be continuous and require four clock cycles for every two bits of data in one non-limiting example. An input FIFO can be dependent on a depuncture input data rate.

It should also be understood that the present invention is not limited to convolutional codes and similar FEC, but also turbo codes could be used as high-performance error correction codes or low-density parity-check codes that approach the Shannon limit as the theoretical limit of maximum information transfer rate over a noisy channel. Thus, some available bandwidth can be increased without increasing the power of the transmission. Instead of producing binary digits from the signal, the front-end of the decoder could be designed to produce a likelihood measure for each bit.

Figure 9:
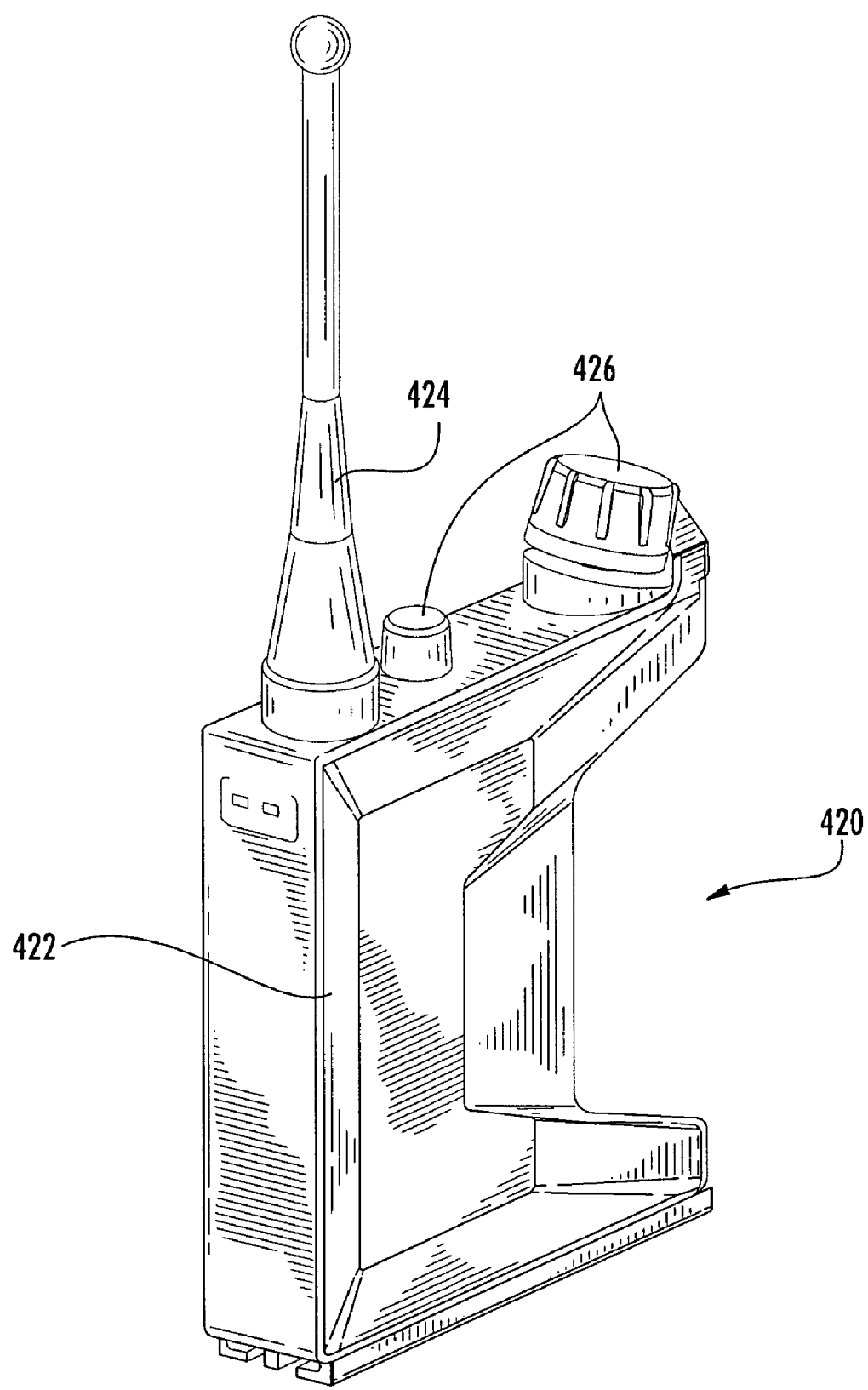
FIG. 9 is a perspective view of a portable wireless communications device as a handheld radio that could incorporate the communications system and radio as modified in accordance with a non-limiting example of the present invention.

The system, in accordance with non-limiting examples of the present invention, can be used in multiprocessor embedded systems and related methods and also used for any type of radio software communications architecture as used on mainframe computers or small computers, including laptops with an added transceiver, such as used by military and civilian applications, or in a portable wireless communications device 420 as illustrated in FIG. 9. The portable wireless communications device is illustrated as a radio that can include a transceiver as an internal component and handheld housing 422 with an antenna 424 and control knobs 426. A Liquid Crystal Display (LCD) or similar display can be positioned on the housing in an appropriate location for display. The various internal components, including dual processor systems for red and black subsystems and software that is conforming with SCA, is operative with the illustrated radio. Although a portable or handheld radio is disclosed, the architecture as described can be used with any processor system operative with the system in accordance with non-limiting examples of the present invention. An example of a communications device that could incorporate the simultaneous wideband and narrowband communications in accordance with non-limiting examples of the present invention, is the Falcon® III manpack or tactical radio platform manufactured by Harris Corporation of Melbourne, Fla.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A communications device, comprising:
a signal input for receiving both wideband and in-band, narrowband communications signals having wideband communications data that is transmitted over a wideband communications channel and narrowband communications data that is transmitted within an in-band, narrowband communications channel over the same wideband communications channel;
a circuit that splits the communications signals into a wideband signal channel and narrowband signal channel;
a narrowband filter within the wideband signal channel that filters the wideband communications signal and removes any narrowband communications signals, said narrowband filter comprising an adaptive filter circuit having a plurality of non-adaptive and adaptive filter taps with weighted coefficients and a circuit configured to select the number and order of adaptive filter taps based on one of at least measured output power from the adaptive filter and signal modulation;
a demodulator within the wideband signal channel that demodulates the filtered wideband communications signal to obtain any wideband communications data; and
an in-band, narrowband demodulator within the narrowband signal channel that demodulates the narrowband communications signals to obtain any narrowband communications data.

2. The communications device according to claim 1 wherein said narrowband communications data within said in-band, narrowband communications signal comprises a break-in message.

3. The communications device according to claim 1 wherein said in-band, narrowband communications signals comprise multiple in-band, narrowband communications signals.

4. The communications device according to claim 1 wherein said wideband communications signal comprises a signal of 500 kHz to 5 MHz bandwidth and said in-band, narrowband communications signal comprises a signal of 25 kHz bandwidth.

5. The communications device according to claim 1 and further comprising one of at least a power control circuit for generating a power control signal for controlling the transmit power from a communications device transmitting the narrowband communications signal to enhance operation of the narrowband filter circuit and processing of the wideband communications signal and a authentication control circuit for checking authenticity of narrowband messages.

6. The communications device according to claim 1 wherein said adaptive filter circuit further comprises a circuit for one of updating the adaptive filter taps responsive to a receive state of a modem or data modulation type within the wideband communications signal, and imparting a variable delay between non-adaptive and adaptive filter taps for separating the spacing of multipath.

7. The communications device according to claim 1 wherein said adaptive filter circuit further comprises a plurality of adaptive filters each having a plurality of non-adaptive and adaptive filter taps.

8. A communications system, comprising:
a plurality of wideband wireless communications devices forming a wideband communications network that communicate with each other using wideband communications signals that are transmitted over a wideband communications channel;
a plurality of narrowband wireless communication devices that communicate using narrowband signals that are transmitted over an in-band, narrowband communications channel within the same wideband communications channel; and
wherein at least one of said wideband wireless communications devices comprises
a signal input for receiving both the wideband and in-band, narrowband communications signals;
a circuit that splits the communications signals into a wideband signal channel and narrowband signal channel;
a narrowband filter within the wideband signal channel that filters the wideband communications signal and removes any narrowband communications signals, said narrowband filter comprising an adaptive filter circuit having a plurality of non-adaptive and adaptive filter taps with weighted coefficients and a circuit configured to select the number and order of adaptive filter taps based on one of at least measured output power from the adaptive filter and signal modulation;
a demodulator within the wideband signal channel that demodulates the filtered wideband communications signal to obtain any wideband communications data; and
an in-band, narrowband demodulator within the narrowband signal channel that demodulates the narrowband communication signals to obtain any narrowband communications data.

9. The communications system according to claim 8 wherein said communications data within said in-band, narrowband communications signal comprises a break-in message.

10. The communications system according to claim 8 wherein said in-band, narrowband communication signals comprise multiple, in-band narrowband communications signals.

11. The communications system according to claim 8 wherein said wideband communications signal comprises a signal of 500 kHz to 5 MHz bandwidth and said narrowband communications signal comprises a signal of 25 kHz bandwidth.

12. The communications system according to claim 8 and further comprising one of at least a power control circuit for generating a power control signal for controlling the transmit power from a communications device transmitting the narrowband communications signal to enhance operation of the narrowband filter circuit and processing of the wideband communications signal and a authentication control circuit for checking authenticity of narrowband messages.

13. A method of communicating data, comprising:
receiving within a communications device both wideband and in-band, narrowband communications signals having wideband communications data that is transmitted over a wideband communications channel and narrowband communications data that is transmitted within in-band, narrowband channels over the same wideband communications channel;

splitting the communications signals into a wideband signal channel and narrowband signal channels;

filtering the wideband communications signal within a narrowband filter formed as an adaptive filter circuit at the wideband signal channel and having a plurality of non-adaptive and adaptive filter taps with weighted coefficients to remove any narrowband communications signals and demodulating the filtered wideband communications signal within a wideband demodulator to obtain any wideband communications data;

demodulating the narrowband communications signals in the narrowband signal channel within an in-band, narrowband demodulator to obtain any narrowband communications data; and selecting the number and order of adaptive filter taps based on one of at least measured output power from the adaptive filter and signal modulation.

14. The method according to claim 13 which further comprises receiving multiple, in-band, narrowband communications signals and demodulating the multiple in-band, narrowband communications signals.

15. The method according to claim 13 which further comprises receiving a narrowband communications signal as a break-in message to a wideband communications network.

16. The method according to claim 13 which further comprises one of at least a generation of a power control signal for controlling the transmit power from a communications device transmitting the narrowband communications signal to enhance operation of the narrowband filter circuit and processing of the wideband communications signal and a authentication control signal which validates authenticity of narrowband messages.

17. The method according to claim 13 which further comprises receiving the wideband communications signal from 500 kHz to 5 MHz bandwidth and the narrowband communications signal at 25 kHz.

18. The method according to claim 13 which further comprises one of updating the adaptive filter taps responsive to a receive state of a modem or data modulation type within the wideband communications signal, and imparting a variable delay between non-adaptive and adaptive filter taps for separating the spacing of multipath.

19. The method according to claim 13 which further comprises filtering within an adaptive filter circuit having weighted coefficients an N number of adaptive filters each having a plurality of non-adaptive and adaptive filter taps with.

20. A communications device, comprising:

a signal input for receiving both wideband and in-band, narrowband communications signals having wideband communications data that is transmitted over a wideband communications channel and narrowband communications data that is transmitted within an in-band, narrowband communications channel over the same wideband communications channel;

a circuit that splits the communications signals into a wideband signal channel and narrowband signal channel;

a narrowband filter within the wideband signal channel that filters the wideband communications signal and removes any narrowband communications signals;

a demodulator within the wideband signal channel that demodulates the filtered wideband communications signal to obtain any wideband communications data;

an in-band, narrowband demodulator within the narrowband signal channel that demodulates the narrowband communications signals to obtain any narrowband communications data; and wherein said narrowband filter circuit comprises an adaptive filter circuit having a plurality of non-adaptive and adaptive filter taps with weighted coefficients and a circuit for one of updating the adaptive filter taps responsive to a receive state of a modem or data modulation type within the wideband communications signal, selecting the number and order of adaptive filter taps based on one of at least measured output power from the adaptive filter and signal modulation, and imparting a variable delay between non-adaptive and adaptive filter taps for separating the spacing of multipath.

21. A method of communicating data, comprising:

receiving within a communications device both wideband and in-band, narrowband communications signals having wideband communications data that is transmitted over a wideband communications channel and narrowband communications data that is transmitted within in-band, narrowband channels over the same wideband communications channel;

splitting the communications signals into a wideband signal channel and narrowband signal channels;

filtering the wideband communications signal within a narrowband filter at the wideband signal channel to remove any narrowband communications signals and demodulating the filtered wideband communications signal within a wideband demodulator to obtain any wideband communications data;

demodulating the narrowband communications signals in the narrowband signal channel within an in-band, narrowband demodulator to obtain any narrowband communications data;

filtering the wideband communications signal within an adaptive filter circuit having a plurality of non-adaptive and adaptive filter taps with weighted coefficients; and one of updating the adaptive filter taps responsive to a receive state of a modem or data modulation type within the wideband communications signal, selecting the number and order of adaptive filter taps based on one of at least measured output power from the adaptive filter and signal modulation, and imparting a variable delay between non-adaptive and adaptive filter taps for separating the spacing of multipath.

* * * * *